Nov. 11, 1969    E. P. CARINI    3,477,536
ELECTRIC DRIVE SYSTEM

Filed Sept. 21, 1967

INVENTOR.
EUGENE P. CARINI

Nov. 11, 1969   E. P. CARINI   3,477,536
ELECTRIC DRIVE SYSTEM
Filed Sept. 21, 1967   2 Sheets-Sheet 2
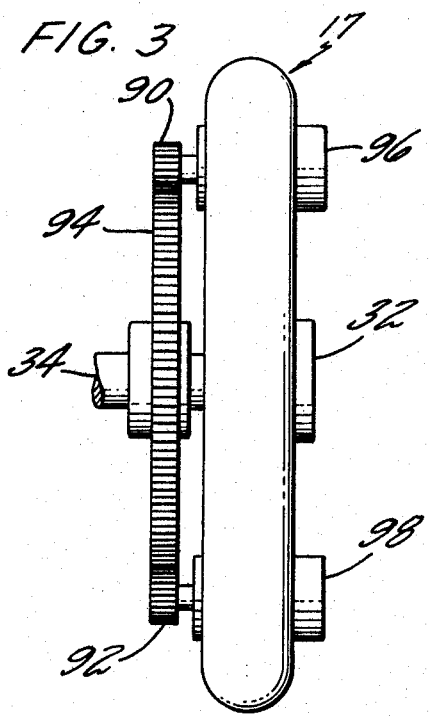
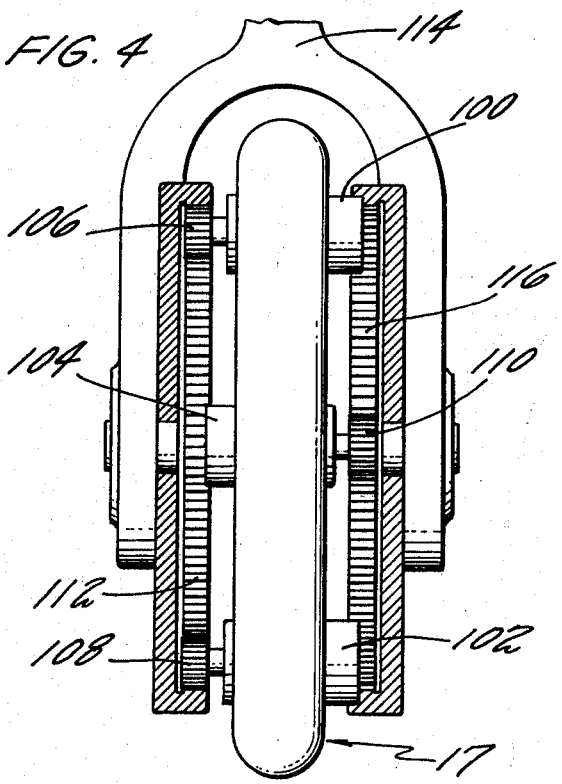
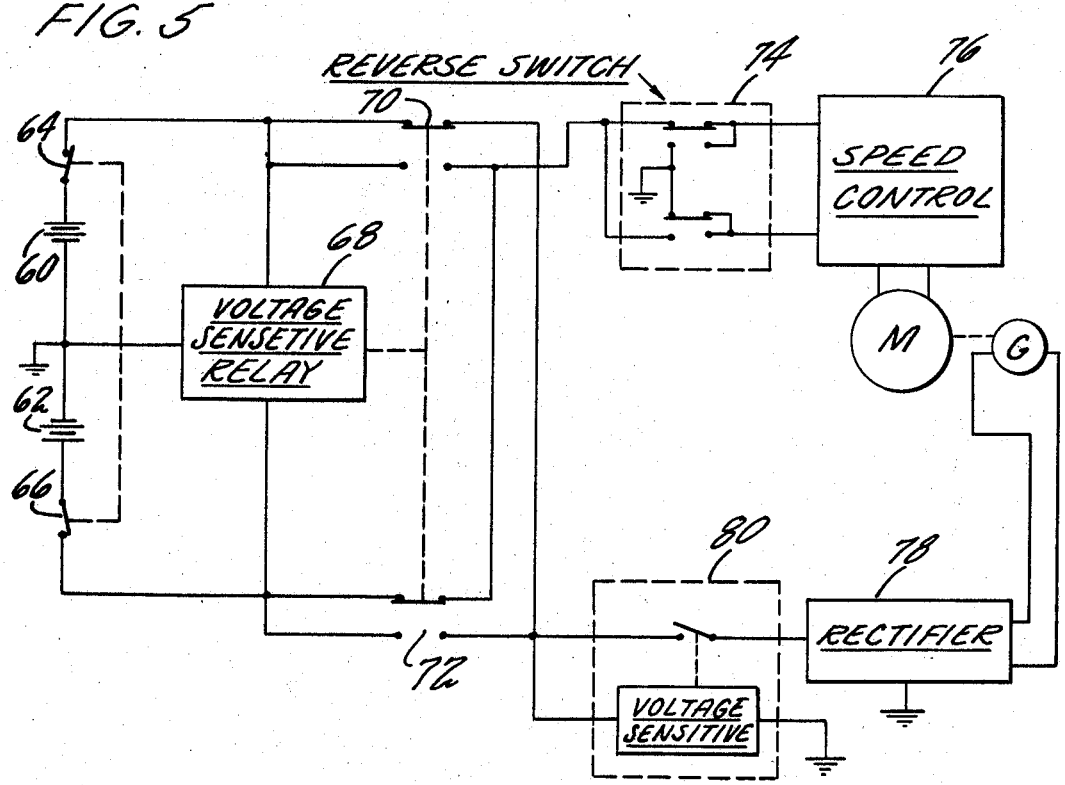

United States Patent Office 3,477,536
Patented Nov. 11, 1969

3,477,536
ELECTRIC DRIVE SYSTEM
Eugene P. Carini, Andover, Conn., assignor to Energy Systems, Inc., Andover, Conn., a corporation of Connecticut
Filed Sept. 21, 1967, Ser. No. 669,536
Int. Cl. B60k *1/00;* F16h *37/06;* H02k *7/00*
U.S. Cl. 180—65   4 Claims

ABSTRACT OF THE DISCLOSURE

An electric drive system wherein each driven member comprises an integral unit including a plurality of electric motors, suitable torque transmitting means and means for delivering electric power to the motors. The electric motors are rigidly mounted adjacent the periphery of the driven member and are coupled to the axle about which the member rotates by the torque transmitting means, the motors thus rotating with the member.

BACKGROUND OF THE INVENTION

Field of the invention

The present invention relates to an electric drive system. More particularly, the present invention is directed to the electrical propulsion of rotating members. Accordingly, the general objects of the present invention are to provide new and improved methods and apparatus of such character.

Description of the prior art

While not limited thereto in its utility, the present invention is particularly well suited for use in the driving of vehicles. Recent concern over air pollution has resulted in renewed interest in electrically propelled vehicles. Past as well as present efforts to develop an electrically propelled vehicle have met with little success. The major problem which has hampered efforts to advance the state of the art consists of the low efficiency of the available drive systems. This problem manifests itself in terms of a limited operating range for electrically propelled vehicles.

The power source for an electrically propelled vehicle of the type which is independent of rails or overhead conductors must of necessity be a device for converting chemical energy to electrical energy. While such a conversion device could be a fuel cell, efforts to date have been directed towards use of banks of wet cell-type batteries as power sources for such vehicles. Current may be drawn from a bank of batteries for but a limited period of time before recharging of the batteries becomes necessary. In order to increase this time period and thus to increase the range of the vehicle, the efficiency of the drive system which converts electrical power to torque and delivers the thus generated torque to the drawing wheels must increase.

The prior art electrical drive system typically comprised a stationary hub mounted electric motor which, by means of belts or gearing operatively connected to the motor output shaft, caused the wheel to be driven about the hub or axle. As noted above, such prior art drive system are relatively inefficient and thus draw excessive power from the batteries.

SUMMARY OF THE INVENTION

The present invention overcomes the disadvantages of the prior art by providing an electric drive of improved efficiency. The drive system of the present invention comprises a plurality of electric motor prime movers which are mounted on and rotate with a drive wheel or other rotating member. By affixing plural prime movers about and adjacent the periphery of a rotating member, the member may be balanced and its rotating mass increased. The increase in mass produces a fly wheel effect which, once the member is set into rotation, results in a reduction of the power necessary to maintain rotation. Similarly, since driving torque is applied to the member about its periphery, power requirements are reduced and, in a vehicular application, the range of the vehicle employing the system is thereby increased.

The output shafts of the plural prime movers of the present invention are coupled to the stationary hub or axle about which the member rotates through a suitable drive system. The drive system may, for example, comprise either a fixed gear which engages gearing coupled to the drive shafts of the motors whereby the motors drive themselves around the fixed gear. Alternatively, the drive system may comprise a fixed position, plural groove pulley which is engaged by V-belts which also contact pulleys coupled to the drive shafts of each of the motors whereby the motors drive themselves about the fixed position pulley by means of the belts.

The present invention also comprises means for transmitting electric power to the plural motors, electrical circuit means for effecting speed control over the plural motors and circuitry which permits recharging of the batteries which comprise the power source for the system.

BRIEF DESCRIPTION OF THE DRAWING

The present invention may be better understood and its numerous advantages will become apparent to those skilled in the art by reference to the accompanying drawing wherein like reference numerals refer to like elements in the various figures and in which:

FIGURE 3 is a front view of a second embodiment of the present invention.

FIGURE 4 is a rear view, partially in section, of a third embodiment of the present invention, the embodiment of FIGURE 4 being especially adapted for a vehicle employing a single drive wheel.

FIGURE 5 is a schematic view of control circuitry which may be employed with the embodiments of FIGURES 1–4.

DESCRIPTION OF THE PREFERRED EMBODIMENT

Figure 1:
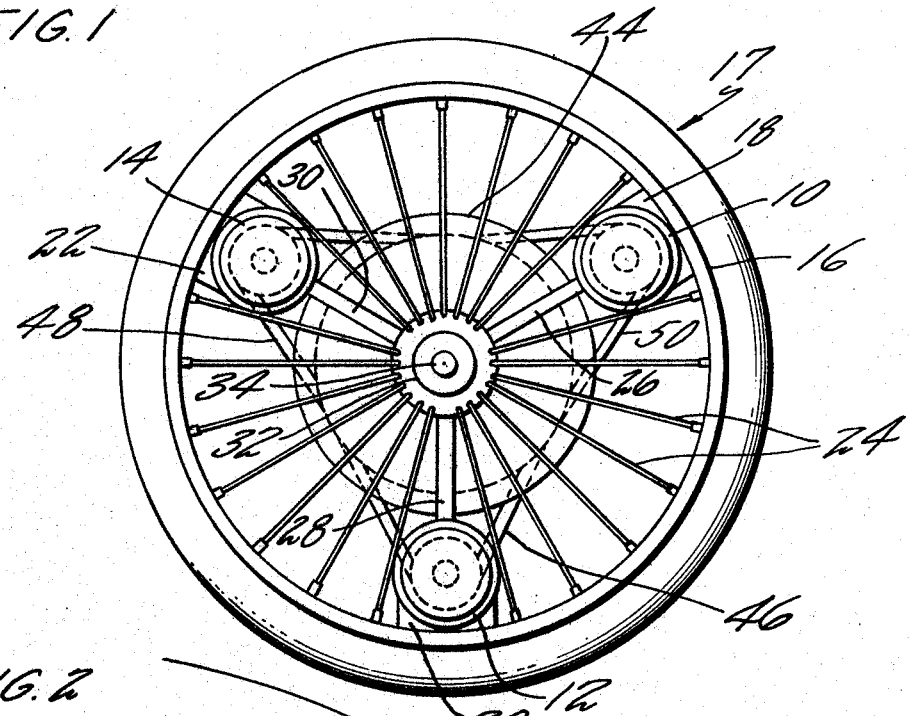
FIGURE 1 is a side elevation view of a first embodiment of the present invention.

Referring now to FIGURE 1, a first embodiment of the present invention employing three prime movers 10, 12 and 14 is shown. Prime movers 10, 12 and 14 consist of direct current motor-generator units. The prime movers could, however, consist merely of direct current motors. Prime movers 10, 12 and 14 are rigidly mounted to the rim 16 of wheel 17 respectively by means of brackets 18, 20 and 22. As may best be seen from FIGURE 2, the motor-generators 10, 12 and 14 pass through the wheel and thus, in the case of the spoked wheel shown, displace several of the spokes 24. In order to preserve the structural integrity of the wheel and to provide further support for the prime movers, motor-generators 10, 12 and 14 are also supported by respective support struts 26, 28 and 30. The support struts extend from the motor housings to hub 32 which rotates about the vehicle axle 34 on bearings, not shown.

Figure 2:
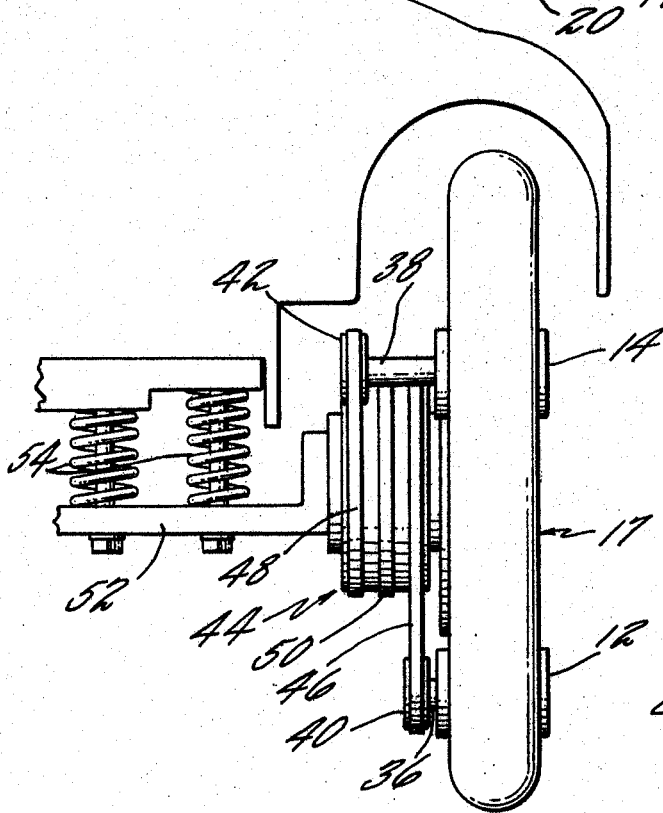
FIGURE 2 is a front view of the embodiment of FIGURE 1 mounted on a vehicle, the vehicle being shown in part.

As may be seen from FIGURE 2, the output shafts of the motors of prime movers 10, 12 and 14 are, in the embodiment of FIGURES 1 and 2, of different length. Thus, the output shaft 36 of prime mover 12 is comparatively short, the output shaft, not shown, of prime mover 10 is of intermediate length and output shaft 38 of prime mover 14 is comparatively long. A pulley 40 is keyed or otherwise secured to shaft 36 of prime mover 12, a pulley 42 is similarly secured to output shaft 38 of prime mover 14 and a third pulley, not shown, is secured to the output shaft of prime mover 10.

A pulley member 44 having three grooves therein is secured to axle 34. The grooves in pulley member 44 are respectively aligned with the pulleys affixed to the output shafts of prime movers 10, 12 and 14. Driving connection is made between the motor output shafts and the vehicle axle by means of three V-belts 46, 48 and 50 which respectively pass around pulleys 40, 42 and the pulley on the output shaft of prime mover 10 and the grooves in pulley member 44 which are aligned vertically with said grooves.

Stationary axle 34 is attached at its inner end to a frame member 52 and the vehicle is suspended above frame member 52 by any suitable cushioning means, a pair of springs 54—54 being shown adjacent the drive wheel in FIGURE 2.

Power in the form of current from a battery bank, not shown in FIGURES 1 and 2, is delivered to the motors comprising motor generators 10, 12 and 14 by conventional slip-ring structure, not shown, which is mounted about the exterior or rotating hub 32 on an insulating member. The brushes and brush holders for the slip-ring assembly are suspended from stationary pulley member 44. The output from the generator portions of the three prime movers will, in the usual instance, be alternating current which will be transmitted from the wheel back to the power source, for purposes to be discussed below, by a brush commutator assembly, now shown, which bridges the rotating gap between the hub and axle.

The embodiment of FIGURES 1 and 2 operates as follows: Upon energization of the motors, the output shafts of prime movers 10, 12 and 14 begin to turn thus rotating the pulleys affixed thereto. However, due to the large area of contact between belts 46, 48 and 50 and the grooves in pulley member 44, the rotation of the pulleys on the motor output shafts does not result in slippage of the V-belts. Instead, the motor shaft pulleys, such as pulleys 40 and 42, drive themselves around stationary pulley member 44, the motor shaft pulleys traveling on belts 46, 48 and 50. In one test apparatus, the belts traveled two inches for each complete rotation of the wheel. The travel of the prime movers 10, 12 and 14 about stationary pulley member 44, of course, results in the driving of the wheel about axle 34. Since the wheel is driven adjacent its outer diameter, and further since the mass of the motors is added to that of the wheel and the motors are rigidly mounted adjacent the periphery of the wheel, a fly wheel effect is achieved and, once set into rotation, minimum power is required to keep the wheel in motion. The decrease in the power requirements for maintaining motion reduces the power drain on the electric power source for the drive system, and thus increases the range of the vehicle.

Referring now to FIGURE 5, the electrical circuitry for a preferred embodiment of the present invention is shown schematically. Power for the drive system comprising the present invention preferably comprises a pair of battery banks 60 and 62. Battery banks 60 and 62 may each consist of a plurality of rechargeable batteries which may be connected either in series, parallel or series-parallel depending on the needs of the system. In the embodiment being described, the negative terminals of batteries 60 and 62 are connected to ground while the positive terminals of the batteries are connected, via ganged switches 64 and 66, to opposite sides of a voltage sensitive relay 68. Voltage sensitive relay 68 may be either an electromechanical device which operates the two pair of double pole-double throw contacts 70-72 when the voltage of either battery falls below that of the other by a preset amount. Alternatively, voltage sensitive relay 68 may be a solid state switching network. As shown in FIGURE 5, ganged switches 64-66 have been closed and current is being delivered to the load via the closed contacts of lower pair of contacts 72 of voltage sensitive relay 68 thus indicating that the voltage across battery 62 has not fallen below the voltage across battery 60 by a preselected percentage of the normal battery output voltage.

With the circuit of FIGURE 5 in the condition shown, current from battery bank 62 is delivered, via switch 66 and the closed pair of contacts 72 of relay 68, to a reverse switch 74 and thence to a speed control 76. Reversing switch 74 controls, in the manner well known in the art, the direction of current flow through the field windings of the prime movers thereby determining the direction of rotation of the motors. Speed control 76 may be any well known device for electrically varying the speed of the motors. If desired or necessary, a control voltage may be tapped off one of the generators and fed back to speed control 76 to automatically maintain a desired speed regardless of changes in load as might be experienced when the vehicle encounters a grade. While only a single motor has been shown connected to speed control 76, it is to be understood that typically the current passed by speed control 76 will be delivered to each of the plurality of motors by means of the commutator arrangement which is interposed between the speed control and motors. Depending upon the requirements of the vehicle, the motors themselves may be either series, shunt or compound type direct current motors and the motors may be connected either in series or parallel across speed control 76.

As shown in FIGURE 5, the generator portions of the prime movers are mechanically connected to and driven by the motor portions thereof. The generators will produce alternating current which will be converted to direct current by means of a rectifier 78. A voltage regulator 80 is connected, via contacts of voltage sensitive relay 68 to the positive terminal of the battery which is not supplying power to the load. This is battery 60 with the circuit in the condition shown in FIGURE 5. Should battery 60 have previously been partially discharged, the contacts of the switch in voltage regulator 80 will be closed and the direct current produced by rectifier 78 will be delivered to battery 60 to thereby cause recharging of the battery.

The switching between batteries 60 and 62 under the control of voltage sensitive relay 68 coupled with the partial regeneration or recharging of the battery which is not delivering current to the load, as achieved through the action of voltage regulator 80, prolongs the life of the batteries and thus permits a vehicle range considerably greater than previously obtainable. Tests have shown that maximum battery life is obtained if relay 68 is set to operate when the voltage of the battery supplying current to the load drops below that of the other battery by not more than 10%. Voltage sensitive relay 68 must, of course, have a built-in time delay so that the relay will not operate at the time of start up of the motors.

For some applications, particularly where the high starting torque of a series wound motor is desired, a belt drive such as shown in FIGURES 1 and 2 has certain disadvantages. Under these conditions, the rim mounted motors may be driven about a stationary gear. Such a system is depicted in FIGURE 3 wherein the motor output shaft pulleys of the embodiment of FIGURES 1 and 2 have been replaced by drive gears 90 and 92 and the stationary pulley member has been replaced by an externally toothed ring gear 94. It is worthy of note that the embodiment of FIGURE 3 employs only a pair of motors 96 and 98 rather than the three motors of the embodiment of FIGURES 1 and 2.

Referring now to FIGURE 4, a drive system particularly well suited for a vehicle having a single drive wheel is shown. The embodiment of FIGURE 4, like that of FIGURE 3, employs a gear rather than belt drive. Unlike the FIGURE 3 embodiment, however, the embodiment of FIGURE 4 employs four drive motors, three of which 100, 102 and 104 are shown. Motors 100, 102 and 104 respectively have gears 106, 108 and 110 affixed to their output shafts. Drive gears 106 and 108 engage an internally toothed ring gear 112 which is attached to the left hand member of the drive wheel support fork 114. Similarly, drive gear 110 engages a stationary, internally toothed ring gear 116 which is affixed to the right hand member of wheel support fork 114. Thus, in the FIGURE 4 embodiment, a pair of motor drives from each side of the wheel and a planetary gear drive system is employed.

While preferred embodiments have been shown and described, various modifications and substitutions may be made without departing from the spirit and scope of the present invention. Accordingly, it is to be understood that the present invention has been described by way of illustration and not limitation.

What is claimed is:
1. A drive system for a land vehicle comprising:
   a driven wheel, said wheel being in contact with the terrain over which the vehicle is to travel;
   at least three electric motors affixed to said wheel at a plurality of points about and adjacent to the periphery thereof;
   stationary axle means about which said wheel rotates; and
   means for transmitting torque from said motors to said axle means whereby said wheel and motors rotate about said axle means.
2. The apparatus of claim 1 wherein said torque transmitting means comprises:
   a stationary pulley affixed to said axle, said pulley having a number of grooves equal to the number of electric motors;
   pulleys affixed to the output shafts of each of said electric motors; and
   belts extending from each of said motor shaft pulleys and an associated groove in said stationary pulley.
3. The apparatus of claim 1 wherein said torque transmitting means comprises:
   a stationary ring gear with internal teeth affixed to said axle; and
   a drive gear affixed to the output shaft of each of said electric motors, said drive gears engaging said stationary gear.
4. An electric drive system for a land vehicle comprising:
   a drive wheel of circular cross section, said wheel being in contact with the terrain over which the vehicle is to travel;
   at least three electric motors affixed to said drive wheel at a plurality of points about and adjacent to the periphery of said drive wheel;
   stationary axle means passing through the center of said drive wheel, said drive wheel being rotatable about said axle means;
   a first rechargeable source of electrical power;
   a second rechargeable source of electrical power;
   voltage sensitive switch means for selectively delivering current from one of said first or second power sources to said motors; and
   means for transmitting torque from said motors to said axle means whereby said drive wheel will rotate about said axle means.

References Cited

UNITED STATES PATENTS

| | | | |
|---|---|---|---|
| 931,743 | 8/1909 | Farrell | 310—112 X |
| 1,095,967 | 5/1914 | Lister | 290—16 |
| 1,101,201 | 6/1914 | Linderoth | 310—67 |
| 1,258,154 | 3/1918 | Shepard et al. | 310—112 |
| 1,284,970 | 11/1918 | Anderson | 180—33 |
| 1,610,666 | 12/1926 | Farrell | 310—112 |
| 2,521,838 | 9/1950 | Ertner | 310—112 |

FOREIGN PATENTS 85,925  10/1921  Austria.

LEO FRIAGLIA, Primary Examiner

M. L. SMITH, Assistant Examiner

U.S. Cl. X.R.

74—665; 310—67, 112